US012348280B2

(12) United States Patent
Zheng et al.

(10) Patent No.: US 12,348,280 B2
(45) Date of Patent: Jul. 1, 2025

(54) METHODS AND DEVICES TO REDUCE ALOS AND NLOS IMPACT ON POSITIONING

(71) Applicant: ZTE CORPORATION, Guangdong (CN)

(72) Inventors: Guozeng Zheng, Shenzhen (CN); Huahua Xiao, Shenzhen (CN); Chuangxin Jiang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 337 days.

(21) Appl. No.: 17/870,753

(22) Filed: Jul. 21, 2022

(65) Prior Publication Data

US 2023/0115204 A1 Apr. 13, 2023

Related U.S. Application Data

(63) Continuation of application No. PCT/CN2020/120514, filed on Oct. 13, 2020.

(51) Int. Cl.
*H04B 17/318* (2015.01)
*H04L 5/00* (2006.01)
*H04W 24/10* (2009.01)

(52) U.S. Cl.
CPC ......... *H04B 17/318* (2015.01); *H04L 5/0051* (2013.01); *H04W 24/10* (2013.01)

(58) Field of Classification Search
CPC .... H04B 17/318; H04L 5/0051; H04W 24/10; G01S 5/0036; G01S 5/0218; G01S 5/0273
See application file for complete search history.

(56) References Cited

U.S. PATENT DOCUMENTS 8,331,955 B2 * 12/2012 Bull .................. G01S 5/04
455/456.2
2011/0287778 A1 * 11/2011 Levin .................. G01S 5/0294
342/461

(Continued)

FOREIGN PATENT DOCUMENTS

CN 108243475 A 7/2018
CN 110178043 A 8/2019

(Continued)

OTHER PUBLICATIONS

Extended European Search Report on EP Appl No. 20956976.3, dated Jul. 5, 2023 (8 pages).

(Continued)

*Primary Examiner* — Tejis Daya
(74) *Attorney, Agent, or Firm* — Foley & Lardner LLP

(57) ABSTRACT

System, methods and apparatuses for enhancing localization of wireless communication devices can include a wireless communication node transmitting, and a wireless communication device receiving, a plurality of reference signals (RSs), for measurement. Each RS can be communicated along a respective transmission link. The wireless communication device can transmit, and the wireless communication node can receive, at least one of assistance information or a report on reference signal receive powers (RSRPs) of a subset of the plurality of RSs, to assist determination of a line-of-sight (LOS) transmission link among the respective transmission links.

17 Claims, 5 Drawing Sheets

(56) References Cited

U.S. PATENT DOCUMENTS

| | | | |
|---|---|---|---|
| 2015/0382318 A1 | 12/2015 | Kim et al. | |
| 2016/0033613 A1 | 2/2016 | Hahn et al. | |
| 2016/0337978 A1* | 11/2016 | Zappi | H04W 52/0258 |
| 2017/0212208 A1 | 7/2017 | Baek et al. | |
| 2020/0022009 A1* | 1/2020 | Hessler | H04B 7/0658 |
| 2020/0106588 A1* | 4/2020 | Gulati | H04L 1/0033 |
| 2020/0132826 A1 | 4/2020 | Achour | |
| 2020/0267682 A1* | 8/2020 | Manolakos | H04L 5/0057 |
| 2021/0239783 A1 | 8/2021 | Calcev et al. | |
| 2022/0026551 A1* | 1/2022 | Park | G01S 13/726 |
| 2022/0060917 A1* | 2/2022 | Vitthaladevuni | G06N 3/08 |
| 2022/0124535 A1* | 4/2022 | Manolakos | H04W 64/00 |
| 2022/0377592 A1* | 11/2022 | Shi | H04B 17/327 |
| 2023/0388959 A1* | 11/2023 | Hasegawa | G01S 5/0036 |

FOREIGN PATENT DOCUMENTS

| | | |
|---|---|---|
| CN | 111238480 A | 6/2020 |
| WO | WO-2020/068295 A1 | 4/2020 |
| WO | WO-2020/206021 A1 | 10/2020 |

OTHER PUBLICATIONS

International Search Report and Written Opinion for PCT Appl. No. PCT/CN2020/120514 mailed Jul. 9, 2021 (8 pages).

Spreadtrum Communications, "Discussion on potential positioning enhancements" 3GPP TSG RAN WG1 Meeting #102-e; R1-2006250; Aug. 28, 2020; e-Meeting (3 pages).

ZTE, "Channel state estimation based on prior channel information" 3GPP TSG RAN WG1 Meeting #102-e; R1-2005465; Aug. 28, 2020; e-Meeting (3 pages).

Fan, K. et al., "Research and Applications on the Key Technologies of Wireless Sensor Networks", Metallurgical Industry Press, Jan. 2016 (10 pages).

First Office Action for CN Appl. No. 202080102762.6, dated Aug. 27, 2024 (with English translation, 16 pages).

Liu, N. et al., "Wireless Local Area Networks (WLAN)—Principle, Technique and Application", Xidian University Press, Apr. 2004 (8 pages).

* cited by examiner

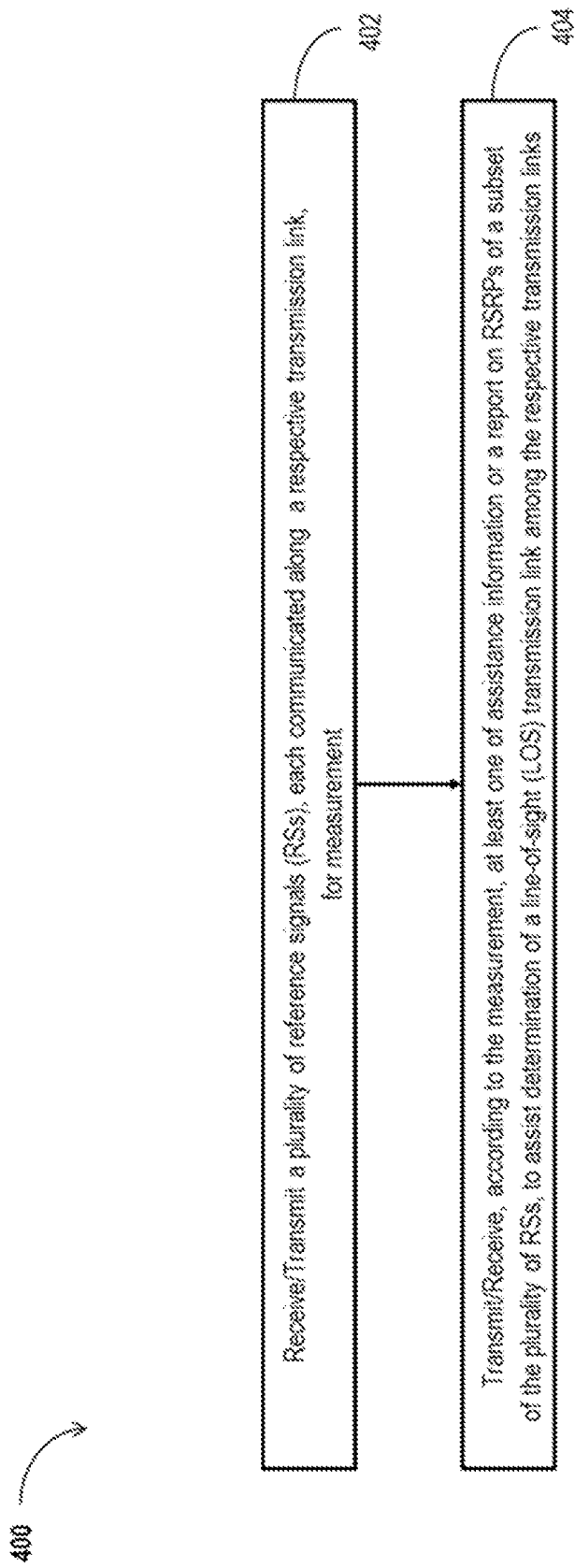

METHODS AND DEVICES TO REDUCE ALOS AND NLOS IMPACT ON POSITIONING

CROSS-REFERENCE TO RELATED APPLICATION

This application claims the benefit of priority under 35 U.S.C. § 120 as a continuation of PCT Patent Application No. PCT/CN2020/120514, filed on Oct. 13, 2020, the disclosure of which is incorporated herein by reference in its entirety.

TECHNICAL FIELD

The disclosure relates generally to wireless communications, including but not limited to systems and methods for reducing the impact of attenuated line-of-sight (ALOS) and non-line-of-sight (NLOS) occurrences on positioning.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a plurality of reference signals (RSs) each communicated along a respective transmission link, for measurement, from a wireless communication node. The wireless communication device may transmit at least one of assistance information or a report on reference signal receive powers (RSRPs) of a subset of the plurality of RSs, to the wireless communication node, to assist determination of a line-of-sight (LOS) transmission link among the respective transmission links.

In some embodiments, the wireless communication device may determine a transmission time of each of the respective transmission links, and transmit the assistance information including timing information about transmission times of a subset of the respective transmission links to the wireless communication node. In some embodiments, the timing information may include a first transmission time of a first link of the subset of the respective transmission links, and a difference in transmission time of a second link of the subset of the respective transmission links with the first transmission time. In some embodiments, the timing information may correspond to an order of the RSRPs of the subset of the plurality of RSs in the report. The order may be determined according to transmission times of transmission links corresponding to the subset of the plurality of RSs. In some embodiments, the timing information may comprise indices linked to the subset of the plurality of RSs or the RSRPs of the subset of the plurality of RSs. The indices may be linked according to transmission times of transmission links corresponding to the subset of the plurality of RSs.

In some embodiments, the wireless communication device may determine a first RSRP of the RSRPs as a reference, by determining the first RSRP as a RSRP having a largest absolute value among the RSRPs, a RSRP that is first in an order of the RSRPs, or a RSRP associated with a RS that has a shortest transmission time among the RSRPs. The wireless communication device may transmit the report comprising the first RSRP and a difference in value of each of the remaining RSRPs with the first RSRP, to the wireless communication node.

In some embodiments, the wireless communication device may determine at least one of path timing information or path power or strength information of at least one transmission link measured using at least one of the plurality of RSs. The wireless communication device may transmit the assistance information including the at least one of the path timing information or the path power or strength information of the at least one transmission link measured using the at least one of the plurality of RSs to the wireless communication node. In some embodiments, the path timing information may comprise at least one of a time of arrival of one path relative to a time of arrival of a first detected path of one of the at least one transmission link. Also, the path power or strength information may comprise at least one of a power or signal strength of the one path relative to that of the first detected path of the at least one transmission link. The one path may have a time of arrival proximate to the time of arrival of the first detected path.

In some embodiments, the wireless communication device may determine coherence bandwidth information of at least one transmission link measured using at least one of the plurality of RSs, and transmit the assistance information including the coherence bandwidth information to the wireless communication node. In some embodiments, the coherence bandwidth information may comprise at least one of a coherence bandwidth of the at least one transmission link or a measurement quality of the coherence bandwidth. In some embodiments, the coherence bandwidth information may comprise a numerical value representing a multiple of a unit. The unit may comprise one of a subcarrier spacing (SCS) or a function of the SCS.

At least one aspect is directed to a system, method, apparatus, or a computer-readable medium. A wireless communication node may transmit a plurality of reference signals (RSs) each communicated along a respective transmission link, for measurement, to a wireless communication device. The wireless communication node may receive, from the wireless communication device, at least one of assistance information or a report on reference signal receive powers (RSRPs) of a subset of the plurality of RSs, to assist determination of a line-of-sight (LOS) transmission link among the respective transmission links.

In some embodiments, a transmission time of each of the respective transmission links may be determined by the wireless communication device. The wireless communication node may receive, from the wireless communication device, the assistance information including timing information about transmission times of a subset of the respective transmission links. In some embodiments, the timing information may include a first transmission time of a first link of the subset of the respective transmission links, and a difference in transmission time of a second link of the subset of the respective transmission links with the first transmission time. In some embodiments, the timing information may correspond to an order of the RSRPs of the subset of the plurality of RSs in the report. The order may be determined according to transmission times of transmission links corresponding to the subset of the plurality of RSs. In some embodiments, the timing information may comprise indices linked to the subset of the plurality of RSs or the RSRPs of the subset of the plurality of RSs. The indices may be linked according to transmission times of transmission links corresponding to the subset of the plurality of RSs.

In some embodiments, a first RSRP of the RSRPs may be determined, by the wireless communication device, as a reference by determining the first RSRP as a RSRP having a largest absolute value among the RSRPs, a RSRP that is first in an order of the RSRPs, or a RSRP associated with a RS that has a shortest transmission time among the RSRPs. The wireless communication node may receive the report comprising the first RSRP and a difference in value of each of the remaining RSRPs with the first RSRP, from the wireless communication device.

In some embodiments, at least one of path timing information or path power or strength information of at least one transmission link measured using at least one of the plurality of RSs may be determined by the wireless communication device. The wireless communication node may receive the assistance information including the at least one of the path timing information or the path power or strength information of the at least one transmission link measured using the at least one of the plurality of RSs, from the wireless communication device. In some embodiments, the path timing information may comprise at least one of a time of arrival of one path relative to a time of arrival of a first detected path of one of the at least one transmission link. Also, the path power or strength information may comprise at least one of a power or signal strength of the one path relative to that of the first detected path of the at least one transmission link. The one path may have a time of arrival proximate to the time of arrival of the first detected path.

In some embodiments, coherence bandwidth information of at least one transmission link measured using at least one of the plurality of RSs may be determined by the wireless communication device. The wireless communication node may receive the assistance information including the coherence bandwidth information from the wireless communication device. In some embodiments, the coherence bandwidth information may comprise at least one of a coherence bandwidth of the at least one transmission link or a measurement quality of the coherence bandwidth. In some embodiments, the coherence bandwidth information may comprise a numerical value representing a multiple of a unit. The unit may comprise one of a subcarrier spacing (SCS) or a function of the SCS.

Some of the embodiments described herein provide solutions for mitigating the impact of ALOS on the accuracy of localization or positioning of wireless communication devices. Specifically, these embodiments allow for distinguishing between LOS and ALOS based on measurements acquired using RSs. The solutions comprise reporting timing information in addition to RSRP. The wireless communication device may report the timing information either explicitly or implicitly. For instance, the wireless communication device may report the transmission time with the RSRP. Alternatively, the wireless communication device may order the RSRP information is according to the value of the corresponding timing information, and report the ordered RSRP without reporting the transmission time or the timing information. In some implementations, the wireless communication device may attach to each RSRP a corresponding timing indicator. The timing indicators can be acquired or defined according to corresponding transmission times. The wireless communication device may report differential RSRP with respect to a reference RSRP. The reference RSRP may be the largest absolute RSRP, the first absolute RSRP or the absolute RSRP with the smallest transmission time of RS.

Some other embodiments described herein provide solutions for NLOS identification based on measurements acquired using RSs, and therefore, enhance the accuracy of localization or positioning of wireless communication devices. The wireless communication device may report surrounding path information to wireless communication node to assist in distinguishing between LOS and NLOS. The surrounding path information may include path time information around the first detected path, or magnitude/power information around the first detected path. The wireless communication device may report coherence bandwidth information to wireless communication node to assist in distinguishing between LOS and NLOS. The coherence bandwidth information may include the bandwidth associated with an autocorrelation of channel frequency response that is greater than or equal to 0.5, the bandwidth associated with an autocorrelation of channel frequency response that is greater than or equal to 0.9 or the quality of coherence bandwidth.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 4 is a flowchart illustrating a method of facilitating, or assisting in, the determination of a line-of-sight (LOS) transmission link, in accordance with some embodiments of the present disclosure.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1 Mobile Communication Technology and Environment

Figure 1:
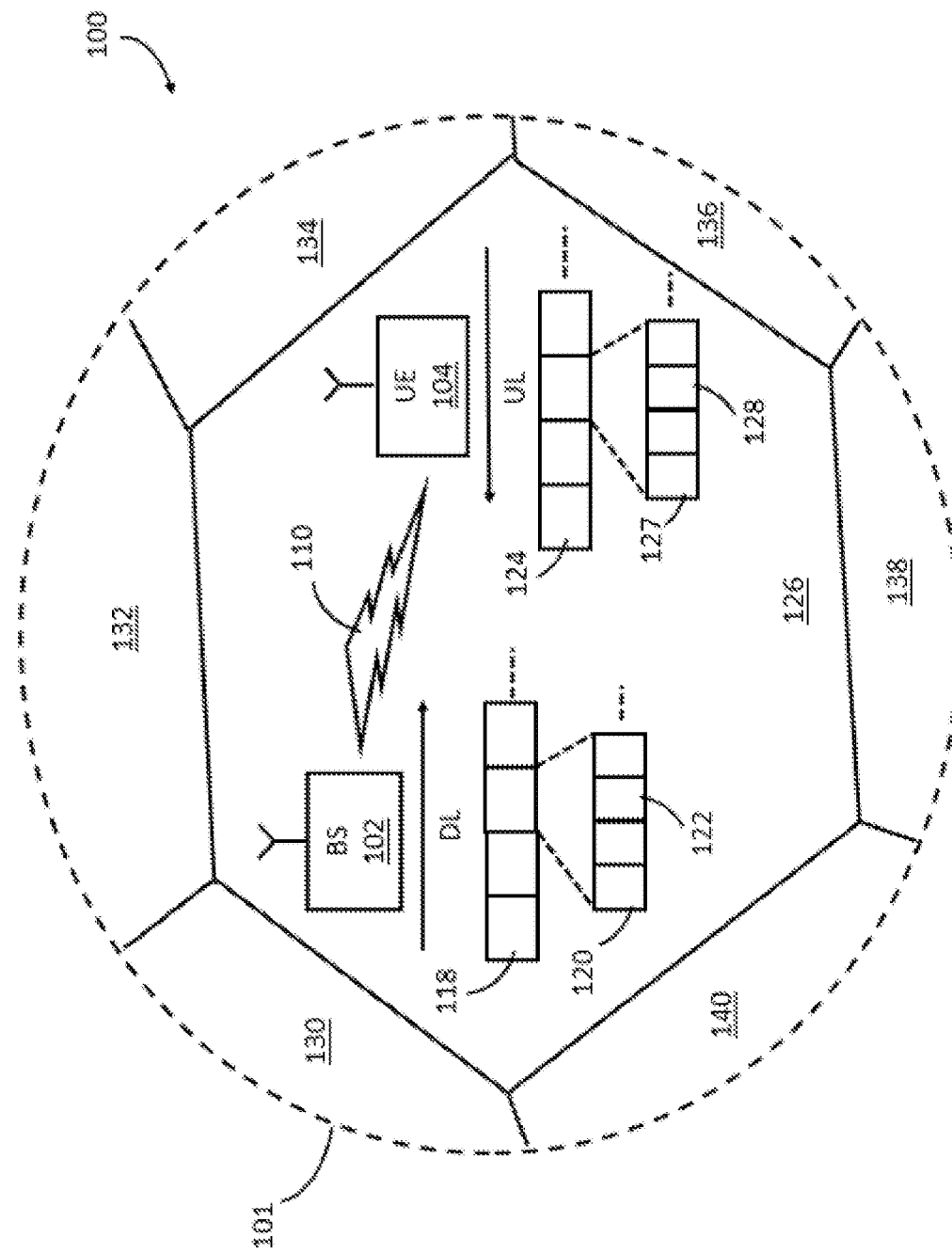
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127, which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
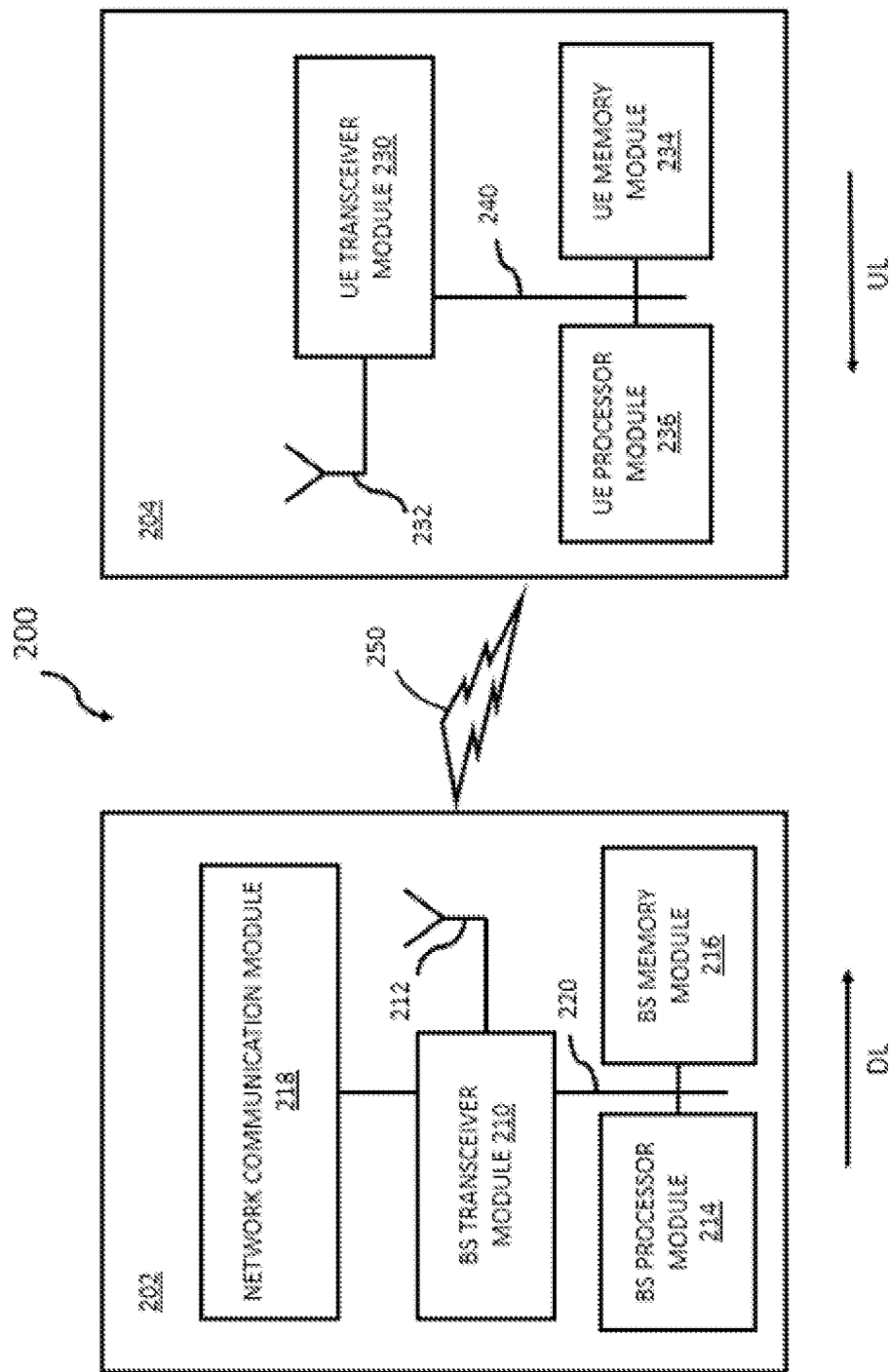
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232.

In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Enhancing Localization/Positioning Accuracy

The capability to localize or position wireless communication devices, e.g., a user equipment (UE), is a core feature of wireless communication networks. The availability and accuracy of localization/positioning of wireless communication devices is critical for various reasons. First, safety legislations in many countries mandate the localization/positioning of wireless communication devices initiating emergency calls. Furthermore, location-based services supported by wireless communication devices rely on the localization/positioning of the wireless communication device even when global positioning system (GPS) signals may not be available. In addition, location/positioning information allows network operators to efficiently allocate and manage their communication resources, and enhance the quality of their communication services.

In wireless localization/positioning systems, localization/positioning techniques based on measurements of angles and timings (or distances), usually assume LOS communication links, that is, the transmission link has LOS path. However, wireless communication is characterized by multi-path signal propagation. Radio signals usually reflect off various obstacles/reflectors without LOS path leading to non-line-of-sight (NLOS) communication links. Also, some other obstacles along the signal propagation path may attenuate the radio signal power without changing the direction of the signal propagation path, therefore, resulting in attenuated line-of-sight (ALOS) communication links. Because of these phenomena, wireless localization/positioning systems may use signal measurements associated with NLOS communication links to localize/position wireless communication devices, which can substantially or strongly impact, or degrade, the accuracy of wireless communication devices' localization/positioning. Specifically, signal measurements associated with NLOS communication links do not correspond to actual distances and/or actual angles. This technical problem calls for reliable solutions or techniques to identify, or distinguish between, ALOS and NLOS communication links. Reliable identification of, or distinction between, ALOS and NLOS communication links allows for mitigating, or eliminating, the degradation in the accuracy of employed localization/positioning techniques.

Wireless communication networks employ and/or configure many reference signals (RSs) for measurements or measurement purposes. Distinct RSs usually correspond to different transmission beams or signals. Specifically, wireless communication nodes (e.g., a base station, evolved bode B (eNB) or next generation node B (gNB)) can transmit or broadcast reference radio signals. A wireless communication device, e.g., UE, can receive the RSs and measure corresponding signal parameters, such as reference signal receive power (RSRP). The wireless communication device can then transmit/report the measured signal parameters or RSRP to the wireless communication network, and the wireless communication network can utilize the measurements, or measured RSs' parameters, to locate/position the wireless communication device. With respect to the use of RSRP for localization/positioning of wireless communication devices, wireless communication networks can usually interpret, or assume, the communication link associated with (or corresponding to) the largest RSRP as being a LOS communication link. However, there are some cases/scenarios where the largest RSRP can be measured from, or correspond to, a NLOS communication link.

Figure 3A:
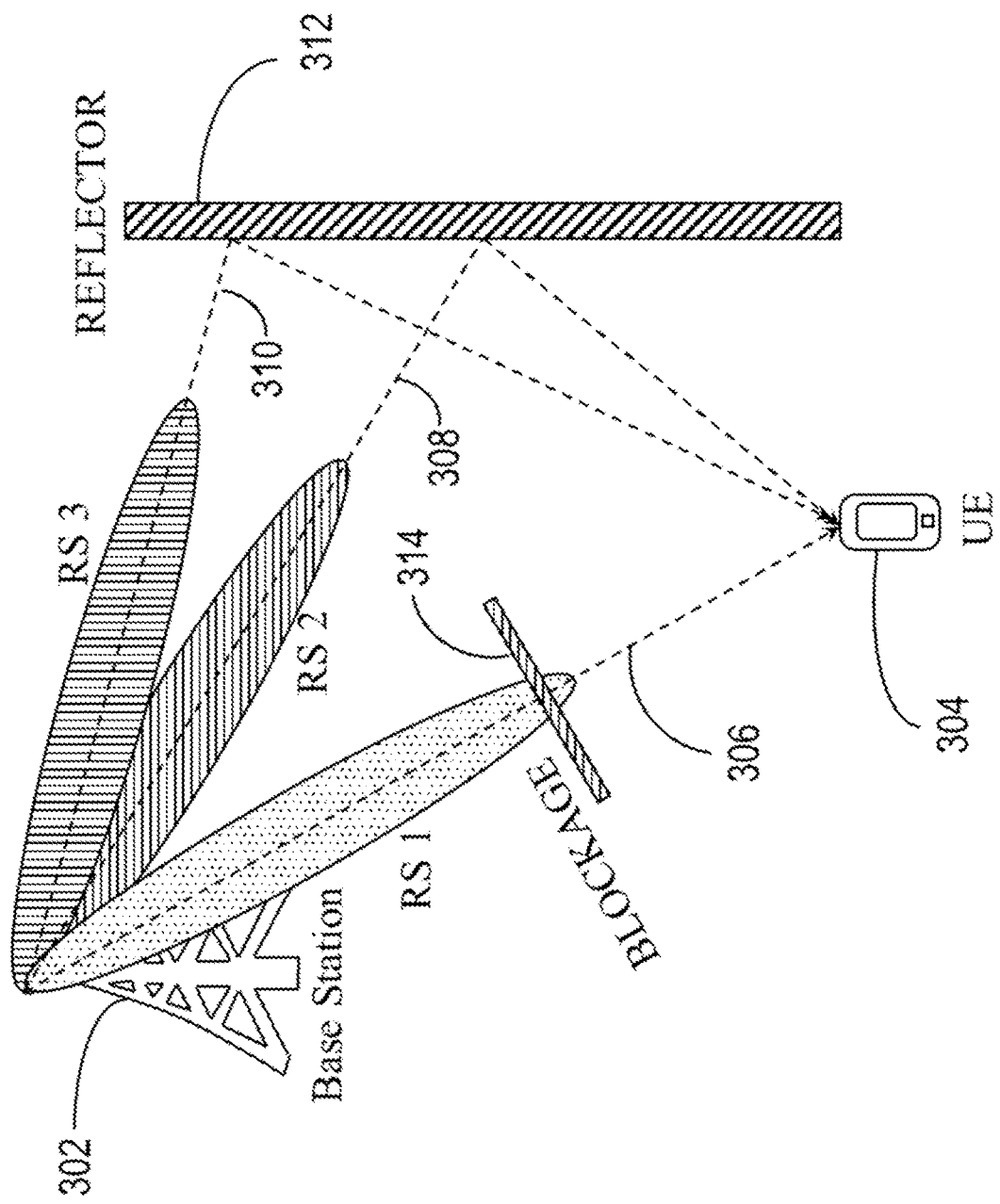
FIG. 3A illustrates an example scenario where measurements of a reference signal (RS) associated with a non-line-of-sight (NLOS) communication link may be used for localization/positioning of wireless communication devices, in accordance with some embodiments of the present disclosure.

Referring to FIG. 3A, an example wireless communication scenario where measurements of reference signal (RSs) associated with a line-of-sight (LOS) communication link and non-line-of-sight (NLOS) communication links may be used for localization/positioning of wireless communication devices is illustrated, in accordance with some embodiments of the present disclosure. A base station or wireless communication node 302 can transmit/broadcast a plurality of RSs, such RS1, RS2 and RS3. A wireless communication device, e.g., UE, 304 can receive the RSs, and measure one or more corresponding signal parameters, such as RSRP, of each of the received RSs. The wireless communication device 304 can then report/transmit/feedback the measured signal parameters of the RSs to the wireless communication node 302 to be used by the wireless communication network to determine/calculate/compute the location/position of the wireless communication device 304. The reference signal RS1 corresponds to, or propagates along, a LOS transmission/communication link 306, while the reference signal RS2 corresponds to, or propagates along, a NLOS transmission/communication link 308. Also, the reference signal RS3 corresponds to, or propagates along, a NLOS transmission/communication link 310. Specifically, the reference signals RS2 and RS3 reflect/bounce off the reflector object/obstacle/medium 312 and change direction before reaching the wireless communication device 304. The reference signal RS1, however, propagates along a straight/direct path between the wireless communication node 302 and the wireless communication device 304.

The wireless communication device 304 can measure/determine the RSRP values RSRP1, RSRP2 and RSRP3 of the reference signals RS1, RS2 and RS3. While the reference signal RS1 propagates along a straight path between the wireless communication node 302 and the wireless communication device 304, it propagates (or traverses) through the blockage obstacle/medium/object 314 along its path. Due to difference in electromagnetic characteristics between the blockage obstacle/medium/object 314 and the air, the blockage obstacle/medium/object 314 can attenuate the power or amplitude of the reference signal RS1. As such, the transmission/communication link 306 can be characterized/defined as an ALOS. Depending on the electromagnetic characteristics of the blockage obstacle/medium/object 314, the receive power of the reference signal RS1 may be attenuated significantly so that the RSRP1 value may be smaller than the RSRP2 value even though the reference signal RS1 corresponds to the LOS transmission/communication link 306 and the reference signal RS2 corresponds to the NLOS transmission/communication link 308. In such case, the wireless communication network may use the RSRP2 (or signal parameters measured using the reference signal RS2, to determine the location/position of the wireless communication device 304, leading to a degradation of the localization/positioning performance or accuracy.

Using signal parameters associated with, or corresponding to, NLOS communication links such as NLOS communication link 308 can lead to incorrect/imprecise localization/positioning of the wireless communication device 304. For instance, the measured signal travel/transmission time is not indicative of the spatial distance between the wireless communication node 302 and the wireless communication device 304, but is rather proportional to the length of the NLOS communication link 308. Accordingly, using signal measurements, or signal parameters, measured using RSs associated with, or corresponding to NLOS communication links leads to incorrect/wrong/inaccurate localization/positioning of the wireless communication device 304. This phenomenon/scenario illustrated in FIG. 3A calls for some mechanisms, techniques or solutions to remove NLOS communication links, or to distinguish ALOS communication links from NLOS communication links, when determining, calculating or computing the location/position of the wireless communication device 304.

Figure 3B:
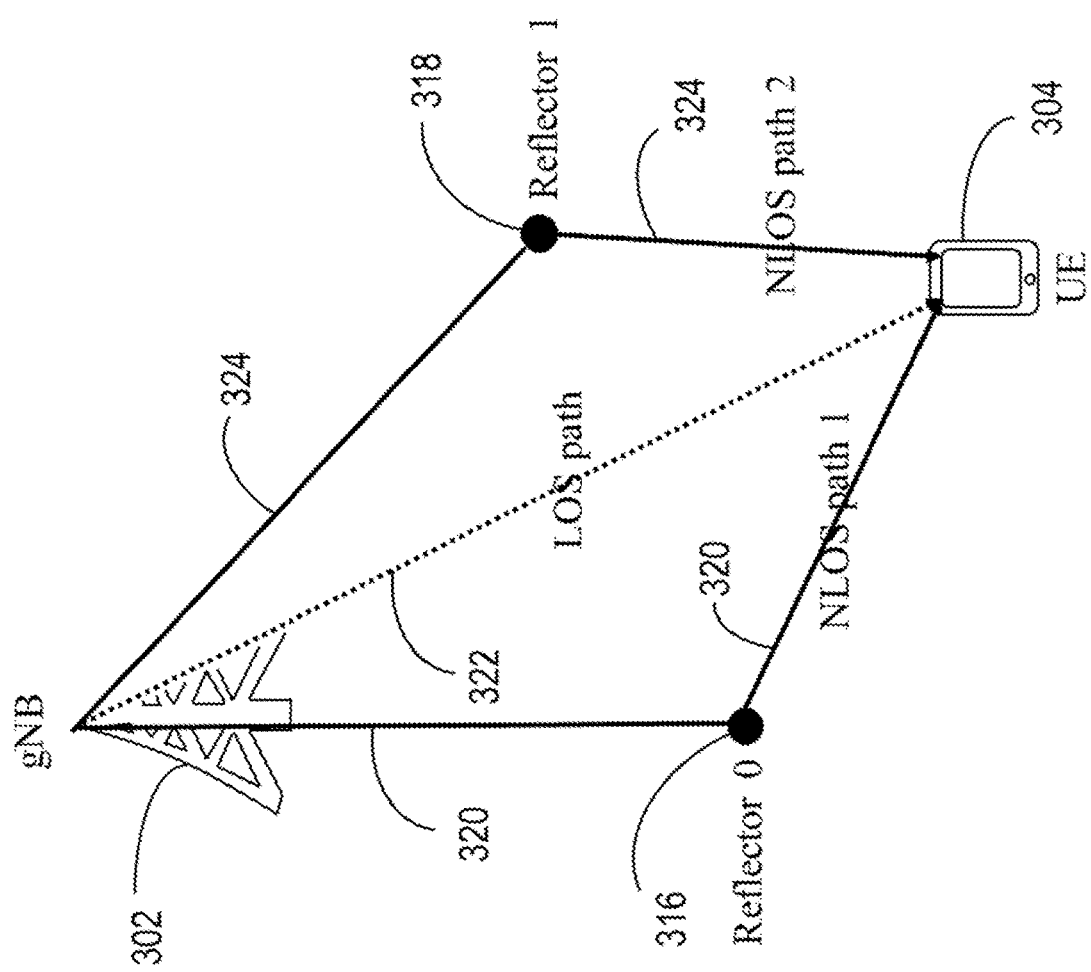
FIG. 3B illustrates another example wireless communication scenario where measurements of LOS and NLOS paths of a reference signal (RS) may be used for localization/ positioning of wireless communication devices, in accordance with some embodiments of the present disclosure.

Referring to FIG. 3B, another example wireless communication scenario where measurements of LOS and NLOS paths of a reference signal (RS) may be used for localization/positioning of wireless communication devices is illustrated, in accordance with some embodiments of the present disclosure. The wireless communication node 302 may transmit/broadcast a single RS at a given time instance. The communication environment can include a first reflector 316, also referred to herein as reflector 0, and a second reflector 318, also referred to herein as reflector 1. The RS can propagate between the wireless communication node 302 and the wireless communication device 304 along multiple paths. For instance, the RS may propagate along three distinct paths 320, 322 and 322 between the wireless communication node 302 and the wireless communication device 304. The path 320 may be a NLOS path where the RS reflects/bounces off reflector 316 (reflector 0) before reaching the wireless communication device 304. The path 322 may be a LOS path where the RS propagates along a straight path between the wireless communication node 302 and the wireless communication device 304. The wireless path 324 may be a NLOS path where the RS reflects/bounces off reflector 318 (reflector 1) before reaching the wireless communication device 304.

The wireless communication device 304 may receive three different versions of the RS corresponding to the wireless paths 320, 322 and 324, respectively. The three received versions of the RS may have different powers or magnitude, different time delays, different distortions, or a combination thereof. The wireless communication device 304 may measure/determine, for each of the wireless paths 320, 322 and 324 or the corresponding received versions of the RS, a corresponding RSRP value. The received signal version of the RS corresponding to the LOS path 322 may suffer some attenuation, e.g., due to a blockage 314 similar to RS1 in FIG. 3A, leading a corresponding RSRP value smaller than the RSRP value NLOS path 320 or NLOS path 324. The received signal version of the RS corresponding to the LOS path 322 may not exist, so the first detected path of the communication link may not be a LOS path, similar to RS2 and RS3 in FIG. 3A, leading to incorrect timing/distance. The wireless communication device 304 may measure/determine/calculate other parameters/metrics, e.g., as discussed in further detail below with regard to FIG. 4, of the received versions of the RS associated with the wireless paths 320, 322 and 324. In the following, various embodiments that include/involve the transmission/reporting/feedback of additional/supplemental signal measurements (e.g., assistance information) based on channel characteristics by wireless communication devices to assist with identification of LOS or NLOS communication links are discussed. While FIGS. 3A and 3B show three different communication links/paths, in general, The RS(s) can propagate along any number of communication links/paths. Also, the communication environment can include any number of reflectors and/or any number of blockages.

Referring now to FIG. 4, a flowchart illustrating a method 400 of facilitating, or assisting in, the identification of a LOS transmission/communication link is described, in accordance with some embodiments of the present disclosure. In brief overview, the method 400 can include receiving/transmitting a plurality of reference signals (RSs), with each RS being communicated along a respective transmission/communication link, for measurement (STEP 402). The method 400 can include transmitting/receiving, according to the measurement, at least one of assistance information or a report on RSRPs of a subset of the plurality of RSs, to assist with the determination of a LOS transmission/communication link among the respective transmission/communication links (STEP 404). The method 400 reflects processes or steps performed by the wireless communication node 302 and the wireless communication device 304.

Referring to FIGS. 3A, 3B and 4, the method 400 can include the wireless communication node 302 transmitting/broadcasting, and the wireless communication device 304 receiving, a plurality of RSs for measurement (STEP 402). Each RS can be communicated, or can propagate, along a respective transmission/communication link. For instance, and as illustrated in FIG. 3A, the reference signal RS1 can propagate along a LOS transmission/communication link 306, while the reference signal RS2 can propagate along a NLOS transmission/communication link 308. As discussed above in FIG. 3B, the wireless communication node 302 may transmit, at a given time instance, a single RS that propagates along a transmission/communication link with multiple paths, and the wireless communication device 304 may receive multiple versions of the RS, each of which associated with a corresponding path. The wireless communication node 302 can transmit/broadcast RSs on a regular or periodic basis.

The RSs can be transmitted/broadcast for use by the wireless communication device 304 to measure signal parameters/measurements/characteristics. In some embodiments, the wireless communication device 304 can measure, for each received RS or each received version (associated with a corresponding communication link/path) of a single RS, a corresponding RSRP. For instance, the wireless communication device 304 can measure or determine the receive powers RSRP1, RSRP2 and RSRP3 for the reference signals RS1, RS2 and RS3, respectively. Assuming all RSs have the same transmission power when transmitted/broadcast by the wireless communication node 302, the variation in RSRPs can indicate/reflect characteristics of corresponding transmission/communication links. For instance, a relatively low RSRP can indicate/reflect a longer transmission/communication link (or propagation path) and/or an attenuation due to blockage obstacle/medium/object 314.

In some embodiments, the wireless communication device 304 can measure or determine one or more other signal parameters or measurements of the received RSs (or the received versions of a single RS) either in addition to or alternative to the RSRPs. The one or more other signal parameters or measurements can include timing parameters/information, surrounding path parameters/information, coherence bandwidth parameters/information or a combination thereof. As discussed in further detail below, the wireless communication device 304 can measure or determine the one or more other signal parameters or measurements for use to identify the RS (or the received version of a single RS) corresponding to the LOS transmission/communication link among the plurality of RSs received by the wireless communication device 304.

The method 400 can include the wireless communication device 304 transmitting, and the wireless communication node 302 receiving, according to the measurement, at least one of assistance information or a report on RSRPs of a subset of the plurality of RSs (or plurality of received versions of a single RS), to assist with the determination of the LOS transmission/communication link among the respective transmission/communication links (STEP 404). The assistance information and the report may be communicated in one or a plurality of messages. For instance, the assistance information may be communicated in one or more messages, and the report may be communicated in another one or more messages, e.g., concurrently or according to an order (or configuration of the wireless communication device 304). Upon determining or measuring the signal parameters for various RSs, the wireless communication device 304 can generate the assistance information and/or the report on RSRPs using the measured/determined signal parameters. For instance, the report on RSRPs can include measured/determined RSRP values for a subset (e.g., one or more or all) of the received RSs. The wireless communication device 304 can select the subset of RSs based on, or using, RSRP values. For example, the wireless communication device 304 can select the subset of RSs having the N largest RSRP values, where N is an integer. In some implementations, the wireless communication device 304 can select the subset of RSs as the first N received RSs. The wireless communication device 304 may select the subset of RSs using, or based on, other measured signal parameters. In some implementations, the subset of RSs can include all received RSs.

The assistance information can include measured or determined timing parameters/information, surrounding path parameters/information, coherence bandwidth parameters/information, other measured signal parameters to assist in the identification the LOS transmission/communication link, or a combination thereof. In some implementations, the assistance information can include information deduced from some of the measured signal parameters. For example, instead of the timing information, the assistance information can include indices or ordering information reflecting an order of the RSs defined based on the timing information.

In some embodiments, the wireless communication device 304 can measure/determine, for each received RS (or each received version of a single RS), the corresponding transmission time (or travel time such as signal propagation time along a transmission path) representing the time duration taken by the RS to travel/propagate from the wireless communication node 302 to the wireless communication device 304. The wireless communication device 304 can detect the time of arrival (or signal reception time) for each RS (or each received version of a single RS), and determine or compute the corresponding transmission time (or travel time) as the difference between time of arrival and the time instance at which the RS was transmitted by the wireless communication node 302. The wireless communication node 302 may communicate the time instance at which the RS was transmitted to the wireless communication device 304. In some implementations, the wireless communication node 302 can transmit/broadcast RSs at predefined time slots or predefined time instances known to the wireless communication device 304.

Considering the example scenario illustrated in FIG. 3A and 3B, the wireless communication device 304 can measure/determine three signal transmission/travel times $t_1$, $t_2$ and $t_3$ of the reference signals RS1, RS2 and RS3, respectively. The wireless communication device may measure/determine both the receive power values RSRP1, RSRP2 and RSRP3 as well as the signal transmission/travel times $t_1$, $t_2$ and $t_3$ of the reference signals RS1, RS2 and RS3 (or versions of the RS associated with the communication links/paths 320, 322 and 324), respectively. The wireless communication device 304 may transmit/broadcast, and the wireless communication node 302 may receive, the assistance information including timing information about the transmission times of the subset of RSs (or subset of the transmission/communication links). The wireless communication device 304 may also transmit/broadcast, and the wireless communication node 302 may receive, the report on RSRPs including information about the measured RSRP values of the subset of RSs (or subset of the transmission/communication links).

In some implementations, the timing information reported in the assistance information can include a first transmission/travel time of a first transmission/communication link of the subset of RSs (or a subset of the respective transmission/communication links), and one or more differences in transmission/travel times of other transmission/communication links of the subset of RSs (or subset of the respective transmission/communication links) with the first transmission/travel time. For example, the wireless communication device 304 may report/transmit, and the wireless communication node 302 may receive, the timing values $t_1$, $t_{21}=t_2-t_1$ and $t_{31}=t_3-t_1$. The wireless communication device 304 may report/transmit, and the wireless communication node 302 may receive, the timing values $t_1$, $t_{21}$ and $t_{31}$ as well as the corresponding RSRP values, e.g., RSRP1, RSRP2 and RSRP3. In some implementations, the wireless communication device 304 may report/transmit, and the wireless communication node 302 may receive, the transmission/travel time values $t_1$, $t_2$ and $t_3$ as well as the corresponding RSRP values, e.g., RSRP1, RSRP2 and RSRP3.

In some implementations, the timing information reported/transmitted by the wireless communication device 304 can be implicit timing information. For instance, the timing information may correspond to, or may be reflected in, an order of the RSRPs of the subset of received RSs arranged (e.g., presented/identified/ordered/indexed) in the report. The wireless communication device 304 may determine the order according to transmission/travel times of the transmission/communication links corresponding to the subset of received RSs. In other words, instead of explicitly reporting/transmitting the timing parameters/information, the wireless communication device 304 may arrange the RSRPs in the report according to an order defined based on the transmission/travel times of the transmission/communication links corresponding to the subset of received RSs. In some embodiments, the first RSRP value in the report may correspond to the RS (or the respective transmission/communication link) having the smallest transmission/travel time, the second RSRP value in the report may correspond to the RS (or the respective transmission/communication link) having the second smallest transmission/travel time, and so on. For example, if $t_1<t_2<t_3$, the wireless communication device 304 may report the RSRP1 as the RSRP value with the highest priority or the first RSRP in the order/sequence of RSRPS in the report. The receive power value RSRP2 may be reported as having the second highest priority or as the second values in the order/sequence of RSRPs in the report. The wireless communication device 304 may report the RSRP3 value may be reported as having the third highest priority or as the third value in the order/sequence of RSRPs in the report.

In some implementations, the timing information reported by the wireless communication device 304, e.g., in the assistance information, may include/comprise indices linked to the subset of received RSs, the RSRPs of the subset of the received RSs or the respective transmission/communication links. The wireless communication device 304 may link/attach/assign the indices according to transmission/travel times of the transmission/communication links corresponding to the subset of the plurality of RSs. For instance, the wireless communication device 304 may link/attach/assign the indices to the RSRPS (or corresponding RSs) according to an increasing order, or otherwise represent an order of the corresponding transmission/travel times. For example, if $t_1<t_2<t_3$, the wireless communication device 304 may link/attach/assign the indices 0, 1 and 2 to RSRP1, RSRP2 and RSRP3 (or RS1, RS2 and RS3), respectively.

In some embodiments, the wireless communication device 304 may determine a first RSRP of the RSRPs as a reference (for use in performing differential reporting of RSRP values). The wireless communication device 304 may determine the first RSRP as the RSRP having the largest absolute value among the measured RSRPs, the RSRP that is first in an order of the measured RSRPs, or the RSRP associated with the RS having the shortest transmission/travel time among the measured RSRPs. The wireless communication device 304 may generate the report on RSRPs to include the first RSRP, and a difference in value of each of the remaining RSRPs with respect to the first RSRP (e.g., differential/relative/difference values of RSRPs). That is, the report may include the values RSRP1, RSRP1-RSRP2 and RSRP1-RSRP3. The wireless communication device 304 may transmit/report, and the wireless communication node 302 may receive, the report comprising the first RSRP and the remaining RSRP difference values. The differential reporting of RSRPs, e.g., reporting the RSRP difference values instead of the actual RSRP values, can reduce the amount of data to be reported/transmitted by the wireless communication device 304 to the wireless communication node 302.

In some embodiments, the wireless communication device 304 can measure, determine or compute surrounding path information to be used to assist in identifying LOS transmission/communication links (or path). In most cases/scenarios, the magnitude/amplitude of the LOS path is larger than the magnitude/amplitude of the remaining paths (e.g., arising from the same RS) for a LOS transmission/communication link because shorter propagation distance usually leads to smaller path loss. In addition, the first detected path for a NLOS transmission/communication link usually appears along with surrounding paths having smaller magnitudes/amplitudes in the power delay profile. The surrounding paths are due to, or generated by, diffusely scattered signal before and after the first detected path. The surrounding paths (e.g., of the same RS) are relatively close to, or in the vicinity of, the first detected path. Therefore, the absolute gradient of magnitude around the detected path for the LOS transmission/communication link is normally larger compared to the absolute gradient of magnitude around the first detected path for a NLOS transmission/communication link. The wireless communication device 304 can determine/compute the absolute gradient of magnitude as the absolute value of the difference in magnitude between the detected path (e.g., the detected path for the LOS link or the first detected path for the NLOS link) and the next (or closest) detected path.

The wireless communication device 304 may determine at least one of path timing information or path power/magnitude/strength information of at least one transmission/communication link measured using at least one of the plurality of RSs. For instance, the wireless communication device 304 may determine/compute path timing information around the first detected path and/or magnitude/power information around the first detected path. In some implementations, the wireless communication device 304 may determine/compute the path timing information as the relative/differential arrival/travel time (e.g., the arrival/travel time difference with respect to the arrival/travel time of the first detected path) of the nearest path or the path proximate to the first detected path. For example, if the first detected path has a transmission/travel time $t_1$ and the next nearest path has a transmission/travel time $t_2$, the wireless communication device 304 may determine/compute the path timing information as $|t_1-t_2|$. The wireless communication device 304 may determine/compute the path magnitude/power information as the relative magnitude/power (e.g., the magnitude/power difference with respect to the magnitude/power of the first detected path) of the nearest path or the path proximate to the first detected path. For example, if the first detected path has a receive power RSRP1 and the next nearest path has a receive power RSRP2, the wireless communication device 304 may determine/compute the path power information as |RSRP1−RSRP2|. If relative magnitude is used, then the wireless communication device 304 may determine/compute the path magnitude information as the absolute value of the difference in magnitude, instead of the difference in RSRP.

In some implementations, the wireless communication device 304 may use some other metric/measure (e.g., other than relative power or relative magnitude) of relative signal strength. For example, the first detected path may have a transmission/travel time equal to $\tau_0$ and corresponding channel coefficient $h(\tau_0)$, and the next nearest path (or the path proximate to) the first detected path may have a transmission/travel time equal to $\tau_1$ and corresponding channel coefficient $h(\tau_1)$. The wireless communication device 304 may determine/compute the path signal strength information as the normalized magnitude difference $$M = \left|\frac{|h(\tau_0)| - |h(\tau_1)|}{\tau_0 - \tau_1}\right|$$

or as the normalized power difference $$P = \left|\frac{|h(\tau_0)|^2 - |h(\tau_1)|^2}{\tau_0 - \tau_1}\right|.$$

The wireless communication device 304 may transmit, and the wireless communication node 302 may receive, the assistance information including the at least one of the path timing information or the path power/magnitude/signal strength information of the at least one transmission/communication link measured using the at least one of the plurality of RSs. For instance, the assistance information may include the arrival/travel time difference $|\tau_0-\tau_1|$, the receive power difference |RSRP1−RSRP2|, the magnitude difference $|h(\tau_0)-h(\tau_1)|$, the normalized magnitude difference $$M = \left|\frac{|h(\tau_0)| - |h(\tau_1)|}{\tau_0 - \tau_1}\right|,$$

the normalized power difference $$P = \left|\frac{|h(\tau_0)|^2 - |h(\tau_1)|^2}{\tau_0 - \tau_1}\right|$$

or a combination thereof.

Upon receiving the path timing information or the path power/magnitude/signal strength information, the wireless communication node 302, or some other network element, may employ a corresponding threshold value to determine whether the transmission/communication link is a LOS link or a NLOS link. For example, if the path timing information or the path power/magnitude/signal strength information (e.g., the change or difference in magnitude/power) is larger than (or meets/satisfies, or is larger than or equal to) the threshold value, then the wireless communication node 302 can determine the corresponding link to be a LOS link with high probability/possibility. However, if the path timing information or the path power/magnitude/signal strength information (e.g., the change or difference in magnitude/power) is smaller than (or smaller than or equal to, or fails to meet/satisfy) the threshold value, then the wireless communication node 302 may determine the corresponding link to be a NLOS link.

In some embodiments, the wireless communication device 304 may determine coherence bandwidth information of at least one transmission link measured using at least one of the plurality of RSs. Coherence bandwidth is a statistical measurement of the frequency range over which the communication link or channel can be considered flat, and is a metric used to define the impact of frequency selective fading. Small coherence bandwidth results in strong frequency selective fading. In some implementations, the coherence bandwidth may be defined as the bandwidth over which the corresponding autocorrelation of channel frequency response is greater than or equal to 0.5 or 0.9. In general, the coherence bandwidth may be defined as the bandwidth over which the corresponding autocorrelation of channel frequency response is greater than or equal to a predefined number or value. Coherence bandwidth is inversely proportional to the delay spread, which represents/ reflects the difference between the time of arrival of the first/earliest signal path and the time of arrival of the last signal path. Since the delay spread for a LOS link is usually smaller than that for a NLOS link, the coherence bandwidth for a LOS link is usually larger than the coherence bandwidth for a NLOS link.

The coherence bandwidth information may include the coherence bandwidth of the at least one transmission/communication link, a measurement quality of the coherence bandwidth or a combination of both. The wireless communication device 304 may determine/compute multiple measurements of the coherence bandwidth. As such, the wireless communication device 304 may determine/compute the measurement quality of the coherence bandwidth as the mean value, standard deviation, variance or confidence level of the multiple measurements of the coherence bandwidth.

The wireless communication device 304 may report/ transmit, and the wireless communication node 302 may receive, the assistance information including the coherence bandwidth information. The wireless communication node 302 may use the coherence bandwidth information to identification LOS or NLOS links, distinguish LOS links from NLOS links. For instance, since the coherence bandwidth for a LOS link is usually larger than the coherence bandwidth for a NLOS link, the wireless communication node 302 may use a threshold value to determine whether the corresponding transmission/communication link is a LOS link or a NLOS link. If the received coherence bandwidth is determined to be greater than (or meets/satisfies, or is larger than or equal to) the threshold value, the wireless communication node 302 may determine the transmission/communication link to be a LOS link, otherwise may determine the transmission/communication link to be a NLOS link. In some implementations, the wireless communication device 304 may use the measurement quality of the coherence bandwidth to make adjustments to coherence bandwidth or to further verify coherence bandwidth.

In some implementations, the wireless communication device 304 may attach/include coherence bandwidth information in each measurement report to assist LOS/NLOS identification, or may transmit the coherence bandwidth information separate from the measurement report(s). In some implementations, the wireless communication device 304 may quantize the coherence bandwidth to an integer, leading to a granularity of the coherence bandwidth that is an integer multiple of a particular unit. In other words, the coherence bandwidth may include, or may be, a numerical value representing a multiple of a unit. The unit (or granularity) may include, or be equal to, a subcarrier spacing (SCS) representing the sub-carrier spacing of the received signals, a function of the SCS or both. In some implementations, the function of the SCS may be defied as $2^k \times SCS$, where k is an integer.

In some implementations, the wireless communication device 304 may also report at least a threshold, which is used by wireless communication device 304 to calculate the coherence bandwidth. For example, the threshold means the coherence bandwidth is determined by the assumption that autocorrelation of channel frequency response is greater than or equal to the threshold. In some implementations, the wireless communication device 304 may report or be required to report multiple coherence bandwidths for a transmission/communication link. For example, different coherence bandwidths may be determined from different thresholds, where the threshold means the coherence bandwidth is determined by the assumption that autocorrelation of channel frequency response is greater than or equal to the threshold.

While the description above illustrates embodiments where the wireless communication node 302 transmits the RS(s), and the wireless communication device 304 performs signal measurements, this disclosure also contemplates embodiments where the wireless communication device 304 may transmit the RS(s) and the wireless communication node 302 may determine signal measurements. The wireless communication node 302 may determine signal measurements according to any of the embodiments discussed above with regard to FIGS. 3A, 3B and 4. The wireless communication node 302 may use the signal measurements to determine/identify a LOS (or NLOS) link/path. The wireless communication node 302 may report the signal measurements to another wireless communication node.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
   receiving, by a wireless communication device from a wireless communication node, a plurality of reference signals (RSs) each communicated along a respective transmission link, for measurement;
   determining, by the wireless communication device, path timing information and path power information of at least one transmission link measured using at least one of the plurality of RSs; and
   transmitting, by the wireless communication device to the wireless communication node according to the measurement, assistance information and a report on reference signal receive powers (RSRPs) of a subset of the plurality of RSs, to assist determination of a line-of-sight (LOS) transmission link among the respective transmission links, the assistance information including the path timing information and the path power information of the at least one of the plurality of RSs,
   wherein the path timing information comprises a time of arrival of one path relative to a time of arrival of a first detected path of one of the at least one transmission link, and the path power information comprises at least one of a power or signal strength of the one path relative to that of the first detected path of the at least one transmission link, wherein the one path has a time of arrival proximate to the time of arrival of the first detected path.

2. The method of claim 1, comprising:
   determining, by the wireless communication device, a transmission time of each of the respective transmission links; and
   transmitting, by the wireless communication device to the wireless communication node, the assistance information including timing information about transmission times of a subset of the respective transmission links.

3. The method of claim 2, wherein the timing information includes: a first transmission time of a first link of the subset of the respective transmission links, and a difference in transmission time of a second link of the subset of the respective transmission links with the first transmission time.

4. The method of claim 2, wherein the timing information corresponds to an order of the RSRPs of the subset of the plurality of RSs in the report, the order determined according to transmission times of transmission links corresponding to the subset of the plurality of RSs.

5. The method of claim 2, wherein the timing information comprises indices linked to the subset of the plurality of RSs or the RSRPs of the subset of the plurality of RSs, the indices linked according to transmission times of transmission links corresponding to the subset of the plurality of RSs.

6. The method of claim 1, comprising:
determining, by the wireless communication device, a first RSRP of the RSRPs as a reference, by determining the first RSRP as: a RSRP having a largest absolute value among the RSRPs, a RSRP that is first in an order of the RSRPs, or a RSRP associated with a RS that has a shortest transmission time among the RSRPs; and
transmitting, by the wireless communication device to the wireless communication node, the report comprising: the first RSRP, and a difference in value of each of the remaining RSRPs with the first RSRP.

7. The method of claim 1, comprising:
determining, by the wireless communication device, coherence bandwidth information of at least one transmission link measured using at least one of the plurality of RSs; and
transmitting, by the wireless communication device to the wireless communication node, the assistance information including the coherence bandwidth information.

8. The method of claim 7, wherein the coherence bandwidth information comprises at least one of:
a coherence bandwidth of the at least one transmission link, or
a measurement quality of the coherence bandwidth.

9. The method of claim 8, wherein the coherence bandwidth comprises a numerical value representing a multiple of a unit, the unit comprising one of:
a subcarrier spacing (SCS), or
a function of the SCS.

10. A method comprising:
transmitting, by a wireless communication node to a wireless communication device, a plurality of reference signals (RSs) each communicated along a respective transmission link, for measurement; and
receiving, by the wireless communication node from the wireless communication device according to the measurement, assistance information and a report on reference signal receive powers (RSRPs) of a subset of the plurality of RSs, to assist determination of a line-of-sight (LOS) transmission link among the respective transmission links, the assistance information including path timing information and path power information for at least one of the plurality of RSs,
wherein the path timing information comprises a time of arrival of one path relative to a time of arrival of a first detected path of one of the at least one transmission link, and the path power information comprises at least one of a power or signal strength of the one path relative to that of the first detected path of the at least one transmission link, wherein the one path has a time of arrival proximate to the time of arrival of the first detected path.

11. The method of claim 10, wherein a transmission time of each of the respective transmission links is determined by the wireless communication device, and the method comprising:
receiving, by the wireless communication node from the wireless communication device, the assistance information including timing information about transmission times of a subset of the respective transmission links.

12. The method of claim 11, wherein the timing information includes:
a first transmission time of a first link of the subset of the respective transmission links, and a difference in transmission time of a second link of the subset of the respective transmission links with the first transmission time.

13. The method of claim 11, wherein the timing information corresponds to an order of the RSRPs of the subset of the plurality of RSs in the report, the order determined according to transmission times of transmission links corresponding to the subset of the plurality of RSs.

14. The method of claim 11, wherein the timing information comprises indices linked to the subset of the plurality of RSs or the RSRPs of the subset of the plurality of RSs, the indices linked according to transmission times of transmission links corresponding to the subset of the plurality of RSs.

15. The method of claim 10, comprising:
receiving, by the wireless communication node from the wireless communication device, the report comprising: a first RSRP of the RSRPs as a reference, and a difference in value of each of the remaining RSRPs with the first RSRP,
the first RSRP determined by the wireless communication device as a reference, by determining the first RSRP as: a RSRP having a largest absolute value among the RSRPs, a RSRP that is first in an order of the RSRPs, or a RSRP associated with a RS that has a shortest transmission time among the RSRPs.

16. A wireless communication device comprising:
at least one processor configured to:
receive, via a transceiver a from a wireless communication node, a plurality of reference signals (RSs) each communicated along a respective transmission link, for measurement;
determine path timing information and path power information of at least one transmission link measured using at least one of the plurality of RSs; and
transmit, via the transceiver to the wireless communication node according to the measurement, assistance information and a report on reference signal receive powers (RSRPs) of a subset of the plurality of RSs, to assist determination of a line-of-sight (LOS) transmission link among the respective transmission links, the assistance information including the path timing information and the path power information of the at least one of the plurality of RSs,
wherein the path timing information comprises a time of arrival of one path relative to a time of arrival of a first detected path of one of the at least one transmission link, and the path power information comprises at least one of a power or signal strength of the one path relative to that of the first detected path of the at least one transmission link, wherein the one path has a time of arrival proximate to the time of arrival of the first detected path.

17. A wireless communication node comprising:
at least one processor configured to:
transmit, via a transceiver to a wireless communication device, a plurality of reference signals (RSs) each communicated along a respective transmission link, for measurement; and
receive, via the transceiver from the wireless communication device according to the measurement, assistance information and a report on reference signal receive powers (RSRPs) of a subset of the plurality of RSs, to assist determination of a line-of-sight (LOS) transmission link among the respective transmission links, the assistance information including path timing information and path power information for at least one of the plurality of RSs, wherein the path timing information comprises a time of arrival of one path relative to a time of arrival of a first detected path of one of the at least one transmission link, and the path power information comprises at least one of a power or signal strength of the one path relative to that of the first detected path of the at least one transmission link, wherein the one path has a time of arrival proximate to the time of arrival of the first detected path.

\* \* \* \* \*